US009041546B2

(12) United States Patent
Pryor et al.

(10) Patent No.: US 9,041,546 B2
(45) Date of Patent: May 26, 2015

(54) SYSTEM AND METHOD FOR POSITION DETECTION

(71) Applicant: Matrix Design Group LLC, Newburgh, IN (US)

(72) Inventors: Aric M. Pryor, Boonville, IN (US); Mike E. Ciholas, Evansville, IN (US); Justin E. Bennett, Newburgh, IN (US); Timothy R. Moore, Newburgh, IN (US); Ben Lemond, Newburgh, IN (US); Ryan Jones, Newburgh, IN (US); Tracy L. Hayford, Newburgh, IN (US)

(73) Assignee: Matrix Design Group, LLC, Newburgh, IN (US)

( * ) Notice: Subject to any disclaimer, the term of this patent is extended or adjusted under 35 U.S.C. 154(b) by 0 days.

(21) Appl. No.: 14/212,668

(22) Filed: Mar. 14, 2014

(65) Prior Publication Data

US 2014/0266759 A1 Sep. 18, 2014

Related U.S. Application Data

(60) Provisional application No. 61/792,530, filed on Mar. 15, 2013.

(51) Int. Cl.
| | |
|---|---|
| *G08B 21/00* | (2006.01) |
| *F16P 3/14* | (2006.01) |
| *E02F 3/16* | (2006.01) |

(52) U.S. Cl.
CPC . *F16P 3/147* (2013.01); *E02F 3/16* (2013.01); *F16P 3/145* (2013.01)

(58) Field of Classification Search
CPC .............. B66F 9/0755; G08B 21/0225; G08B 21/0227; G08B 21/028; G08B 2315/00; G06K 17/0022

USPC .......... 340/686.1, 686.5, 686.6, 572.1, 572.4, 340/572.7, 573.1, 539.13; 701/301; 713/320

See application file for complete search history.

(56) References Cited

U.S. PATENT DOCUMENTS

| | | | |
|---|---|---|---|
| 5,939,986 A | 8/1999 | Schiffbauer et al. | |
| 6,339,709 B1 * | 1/2002 | Gladwin et al. ........... | 455/115.1 |

(Continued)

*Primary Examiner* — George Bugg
*Assistant Examiner* — Edny Labbees
(74) *Attorney, Agent, or Firm* — C. Richard Martin

(57) ABSTRACT

A system and method for detecting a position of a person or second machine relative to a machine is provided. The system includes a transmitter system located on the machine, a locator for being carried by the person, means for determining the position of said locator relative to the transmitter system, means for defining one or more safety zones around the machine; and warning means for generating a signal when said locator enters into any of said one or more safety zones. The transmitter system includes a controller for generating a uniquely encoded magnetic signal and a plurality of drivers in communication with the controller for transmitting the uniquely encoded magnetic signal. According to the method a uniquely encoded magnetic signal is generated and transmitted around the machine from a transmitter system located on the machine. The magnetic signal is received and processed at a locator carried by the person. A locator radio frequency signal is transmitted from the locator in response to the received and processed magnetic signal. The locator radio frequency signal is received at the transmitter system. An algorithm is performed at the transmitter system based on the magnetic signal and locator radio frequency signal to determine the position of the locator relative to the transmitter system.

31 Claims, 9 Drawing Sheets

(56) References Cited

U.S. PATENT DOCUMENTS

| | | |
|---|---|---|
| 6,810,353 B2 | 10/2004 | Schiffbauer |
| 7,420,471 B2 * | 9/2008 | Frederick et al. .......... 340/572.7 |
| 8,115,634 B2 * | 2/2012 | Napolitano ................ 340/572.1 |
| 8,289,170 B2 | 10/2012 | Pryor et al. |
| 8,446,277 B2 | 5/2013 | Frederick |
| 8,558,714 B1 * | 10/2013 | Liff et al. ................... 340/686.6 |
| 2009/0267787 A1 * | 10/2009 | Pryor et al. ................ 340/686.6 |
| 2012/0159604 A1 * | 6/2012 | Bojinov et al. ................... 726/9 |
| 2013/0038320 A1 * | 2/2013 | Frederick ................ 324/207.13 |
| 2014/0002271 A1 * | 1/2014 | Frederick .................. 340/686.6 |
| 2014/0253708 A1 * | 9/2014 | Allen et al. ..................... 348/77 |
| 2014/0266698 A1 * | 9/2014 | Hall et al. ................ 340/539.13 |

\* cited by examiner

SYSTEM AND METHOD FOR POSITION DETECTION

BACKGROUND OF THE INVENTION

1. Field of the Invention

The present invention relates to a system and method for the detection of one or more locator units in the proximity of a transmitter system. More specifically, the present invention relates to a system that detects the proximity of a person or machine carrying the locator to a dangerous machine configured with the driver system, and determines the exact location of that person or machine and if that person or machine is close enough to be in danger. The system and method according to the present invention can also be used in a vehicle to vehicle collision avoidance setting where one or more drivers are positioned on a primary vehicle and a locator is positioned on each of one or more secondary vehicles. The proximity detection system and method of the present invention can be used on any mobile equipment, and is not intended to be limited to the mining industry.

2. Description of Prior Art

Industrial machines may be necessarily large and powerful. For example, continuous mining machines may be 40 feet long, 10-12 feet wide, 3-4 feet tall, and weigh 40 tons. Such machines have injured or killed people while being operated. For example, in "tramming," a continuous mining machine mounted on tracks is moved from one location to another in confined spaces at relatively high speeds and can turn or change directions fast enough to pin an operator against a rib (i.e., wall) of the mining space.

With respect to the environment, it may not be possible to set up traditional operator protection systems, such as light fences or guard rails, because the environment is generally unstructured (e.g., mining machines create the environment as they operate). Further, such environments are often noisy, dusty and wet.

A transducer, speaker or microphone that is exposed to such an environment is not likely to survive or function properly. For example, sonar and laser time-of-flight sensors exposed to such an environment will become dirty and non-operational very quickly. Further, such sensors have difficulty distinguishing between a person and other structural components in the environment, such as the wall of the mining space.

With respect to radio time-of-flight sensors, such as radar, while the components may be more durable in the environment the relatively short distances (e.g., two feet to 50 feet) between the operator and the machine make such sensors impractical and unreliable. Further, the requirement of a relatively large radio dish or directional radio antenna is impractical.

Alternatively, other systems utilize a magnetic field generator on the machine and a magnetic field sensor carried by the operator. The magnetic field generator creates a magnetic field around the machine. The magnetic field sensor senses the strength of the magnetic field and then relays the strength of the field by radio back to the machine. If the operator is determined to be too close to the machine, the machine is shut down. However, this system is limited to a substantially circular safety perimeter around the machine, so there is no ability to arbitrarily define a safety perimeter because there is no way to determine an exact location of the operator with respect to the machine. Thus, the safety perimeter must be set to a radius that includes a safety margin from the most distant points of concern of the machine, leaving areas that are safe inside of the safety perimeter. This becomes a nuisance because it prevents the operator from operating in areas that are safe and effective because of the lack of geometric control of the safety perimeter.

In the invention disclosed in U.S. Pat. No. 8,289,170, applicants herein invented a system that could determine the location of the operator with respect to the machine and, if necessary, shut the machine down without requiring any structure in the environment. That system included transmitters on the operators and a plurality of receiver units on the machine. One disadvantage of this system is that, because the transmitters are on the operators, not the machine, power and range are necessarily limited.

Thus, what is needed is a system for determining the location of the operator with respect to the machine wherein an encoded signal of greater power can be transmitted to increase the area in which an operator can be detected. Further, there is needed a system where the range and shape of the encoded signal can be customized and modified to suit the particular needs of the machinery being used. Advantageously, with such a system, the operator will learn to maintain a safe distance from the machine to be efficient in their job.

SUMMARY OF THE INVENTION

The present invention is a system and method for detecting a position of an object relative to a machine. The system and method according to the present invention can also be used in a vehicle to vehicle collision avoidance setting where one or more drivers are positioned on a primary vehicle and a locator is positioned on each of one or more secondary vehicles.

According to one aspect of the present invention there is provided a system for detecting a position of an object relative to a machine. The system includes a transmitter system located on the machine, a locator for being carried by the object, means for determining the position of said locator relative to the transmitter system, means for defining one or more safety zones around the machine, and warning means for generating a signal when said locator enters into any of the one or more safety zones. The transmitter system may include a controller for generating an encoded signal and a plurality of drivers in communication with the controller for transmitting the encoded signal.

A digital radio transceiver located in the controller may also be provided. According to this aspect of the invention, the controller also generates a driver radio frequency signal and the digital radio transceiver transmits the driver radio frequency signal. The driver radio frequency signal preferably contains parameters including magnetic signal timing, signal duration, frequency construction, encoding, signal type, message time & date stamp, and machine serial number.

According to yet a further aspect of the invention, the encoded signal is a uniquely encoded magnetic signal and the locator of the system for position detection includes a locator microcontroller for processing data and controlling locator functions, one or more magnetic proximity signal receiving coils in communication with the locator microprocessor for receiving the uniquely encoded magnetic signal, and a digital radio transceiver in communication with the locator microcontroller for receiving the driver radio frequency signal and transmitting a locator radio frequency signal. The one or more encoded signal receiving coils may include a first magnetic proximity signal receiving coil, a second magnetic proximity signal receiving coil oriented orthogonally to the first magnetic proximity signal receiving coil, and a third magnetic proximity signal receiving coil oriented orthogonally to the first magnetic proximity signal receiving coil and to the second magnetic proximity signal receiving coil. An accelerometer may also be provided as part of the locator for measuring a direction of gravity. Where multiple persons are in the vicinity of the machine, a plurality of locators associated with a corresponding plurality of persons may be used.

The locator microcontroller, signal receiving coils and transceiver are preferably contained within a dust-proof casing capable of passing both the magnetic signal and the driver radio frequency signal and the locator radio frequency signal. According to one preferred embodiment of the present invention, the locator housing is intrinsically safe.

An internal battery may be located within the dust-proof casing of the locator. External contacts on an outer surface of the dust-proof casing may also be provided for making contact with a locator charging station. The external contacts may be in communication with the internal battery and with the locator microcontroller. A battery manager/local regulating circuit may also be provided in communication with the external contacts, internal battery and locator microcontroller for controlling charging current. For protecting the internal battery from overcharge, over discharge, and over current conditions, a battery protection circuit connected between the battery manager/local regulating circuit and the internal battery may be provided. The battery manager/local regulator circuit preferably feeds power to the locator microcontroller and the one or more magnetic proximity signal receiving coils.

A further aspect of the locator of the system for position detection according to the present invention includes means for accepting user input and displaying information to the person. The means for accepting user input and displaying information may include an input button in communication with the locator microcontroller to accept input from the person, and an audiovisual display device in communication with the locator microcontroller to provide information to the person. Alternatively, the means for accepting user input and displaying information may include a touch-screen type display screen that is capable of both displaying information to the person and accepting input from the person.

According to another aspect of the invention, the encoded signal is a uniquely encoded magnetic signal and each of the plurality of drivers of the system for position detection includes a power and signal conditioner in communication with the controller for preparing the magnetic signal generated by the controller for transmission. Each driver further includes a coil driver in communication with the signal conditioner for receiving the encoded signal for transmission, and a magnetic proximity transmitting coil in communication with the coil driver for transmitting the magnetic signal. Each driver may also include a driver microcontroller positioned between and in communication with the signal conditioner and the coil driver for further enhancing or modifying the magnetic signal for transmission. Status indicators in communication with the driver microcontroller that are externally visible to indicate to the person that the magnetic signal is being transmitted by the driver may also be provided.

An enclosure surrounding the power and signal conditioner, driver microcontroller coil driver and transmitting coil may also be provided. The enclosure is preferably formed from a material that is strong enough to be machine mounted and survive in a mining environment, but still pass the magnetic proximity signal.

A further aspect of the invention is to provide a controller for the position detection system wherein the controller comprises a controller microcontroller in communication with a plurality of driver connectors through a plurality of corresponding communication interfaces. Each of the plurality of driver connectors is preferably in communication with a respective one of the plurality of drivers. The controller may further include a power input for receiving power from the machine, and a receiver power controller in communication with the power input. The controller power input, controller power controller and plurality of communication interfaces may provide intrinsically safe power to the plurality of drivers through the corresponding plurality of driver connectors. An explosion proof enclosure surrounding the components of the controller may also be utilized.

The controller may, according to another aspect of the invention, include a digital radio transceiver and digital radio antenna in communication with the controller microcontroller for processing and transmitting a driver radio frequency signal generated by the controller and for receiving and processing a locator radio frequency signal from the locator.

The system for position detection according to the present invention may further include control interface in communication with the controller for receiving commands to control operation of the machine and for reporting an operating state of the machine. The controller may include machine inputs, machine input connectors, machine outputs, and machine output connectors, which cooperate with the control interface for receiving the operating state signal indicating the operating state of the machine and outputting a control signal to the control interface of the machine. Additional input/output connectors selected from a group consisting of USB, CANbus, and Ethernet connectors may also be connected to the controller.

The system for position detection may further include warning means in the form of a warning indicator in communication with the controller microcontroller for outputting the proximity warning signal. The means for determining the position of the locator may include an algorithm performed at the transmitter system based on the magnetic signal and locator radio frequency signal.

The means for defining one or more safety zones may include data input into the controller defining a corresponding one or more boundaries within a magnetic signal generated by the transmitter system. The one or more safety zones may preferably comprise a first warning boundary zone and a second operation limiting boundary zone. Means for dynamically altering the one or more safety zones may also be provided.

Another aspect of the invention includes a system for position detection wherein the machine is an articulating machine having a front section and a rear section connected at an articulating point. A machine mounted locator is positioned on the rear section of the articulating machine. One or more of the plurality of drivers are positioned on the front section of the articulating machine, and one or more of the plurality of drivers are positioned on the rear section of the articulating machine.

The object that carries the locator according to one aspect of the invention is a person. According to an alternative aspect, the object is a second machine.

A further aspect of the present invention is a method for detecting a position of an object relative to a machine. According to the method, an encoded signal is generated and transmitted around the machine from a transmitter system located on the machine. The encoded signal is received at a locator carried by the object and processed at the locator. A locator radio frequency signal is then transmitted from the locator in response to the received and processed encoded signal. The locator radio frequency signal is received at the transmitter system. Finally, an algorithm is performed at the transmitter system based on the encoded signal and locator radio frequency signal to determine the position of the locator relative to the transmitter system.

Further steps of the method include defining one or more safety zones around the machine, determining if the location of the locator relative to the machine is within the one or more safety zones around the machine, and generating a warning signal when the locator enters into any of the one or more safety zones.

The step of emitting an encoded signal around the machine from a transmitter system located on the machine includes first generating the encoded signal from a controller of the transmitter system. Next, the encoded signal is transmitted from a plurality of drivers in communication with the controller.

The method may include further steps of generating a driver radio frequency signal at the controller, and transmitting the driver radio frequency signal from a digital radio transceiver located in the controller. The driver radio frequency signal is preferably generated and transmitted prior to generating and transmitting the encoded signal. The driver radio frequency signal may include parameters including magnetic signal timing, signal duration, frequency construction, encoding, signal type, message time & date stamp, and machine serial number. The locator may be synchronized with one or more of the plurality of drivers.

The step of performing an algorithm at the transmitter system based on the encoded signal and locator radio frequency signal to determine a position of the locator relative to the transmitter system may include additional substeps. A received signal strength of the encoded signal received by the locator from at least two of the plurality of drivers may be compared with known locations of the at least two of the plurality of drivers. A distance value from at least two of the plurality of drivers for each locator radio frequency signal may be received. Two drivers with the lowest distance values may then be selected. An arc of distance from each one of said two drivers given the known locations of said two drivers may then be determined. The two points at which the arc from the first one of said two drivers intersects with the arc of the second one of said two drivers is then calculated. The location of the locator is then determined by selecting the one of two points of intersecting arcs that is external to the machine.

According to one aspect of the method of the present invention, the encoded signal may be a magnetic signal. The object according to certain aspects of the invention could be either a person or a second machine.

DETAILED DESCRIPTION OF PREFERRED EMBODIMENTS

For the purpose of this document, "intrinsically safe" shall be as defined by the U.S. Department of Labor, Mine Safety and Health Administration (MSHA). Further, for the purpose of this document, the various microcontrollers described herein are understood to execute software or program instructions included in or accessible by the microcontrollers in a tangible storage medium, such as random access memory (RAM), read only memory (ROM), Electrically Erasable Programmable Read-Only Memory (EEPROM), flash memory, or the equivalent.

Figure 1:
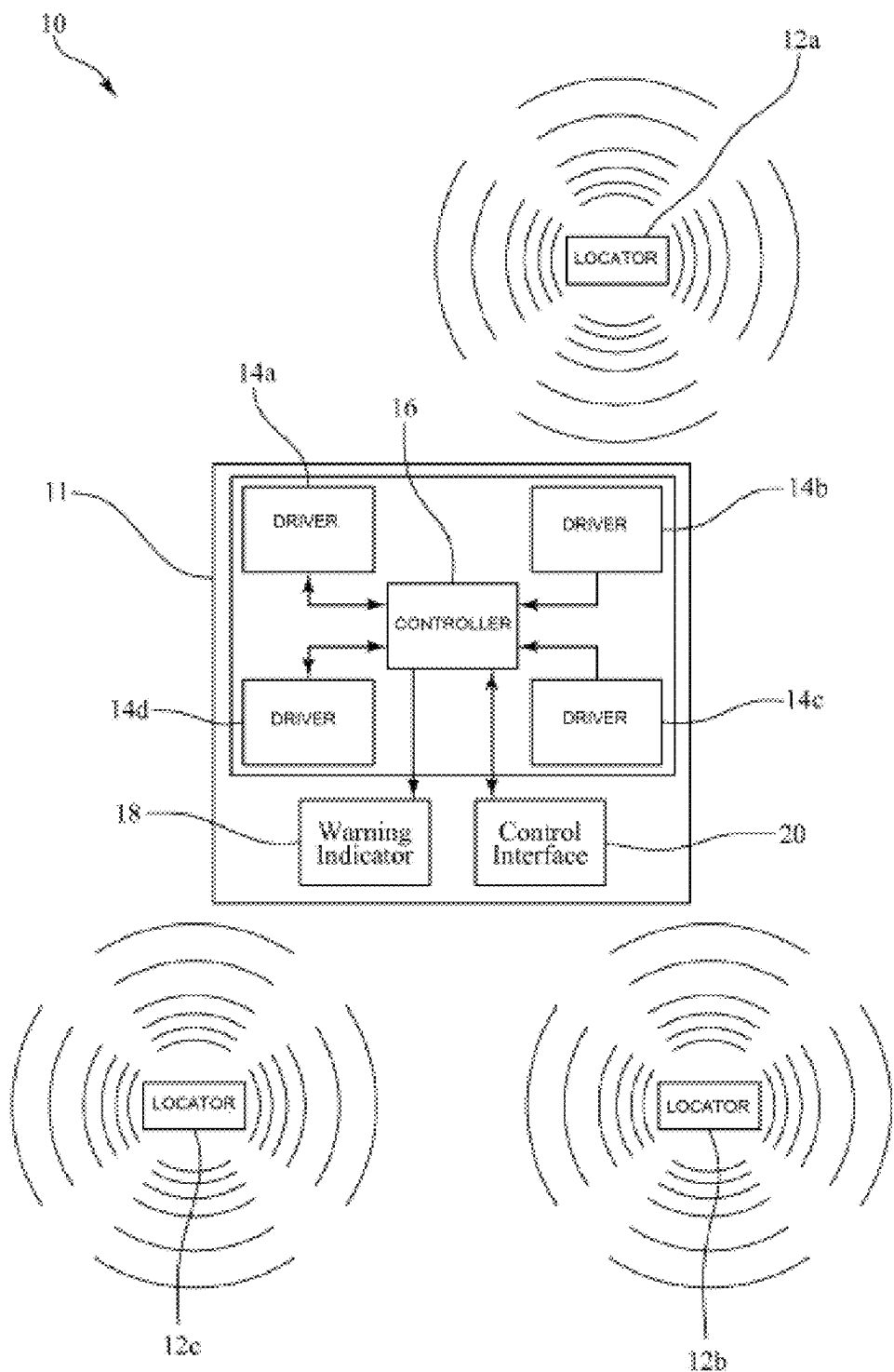
FIG. 1 is a functional block diagram of an exemplary system for proximity detection according to the invention.
Figure 2:
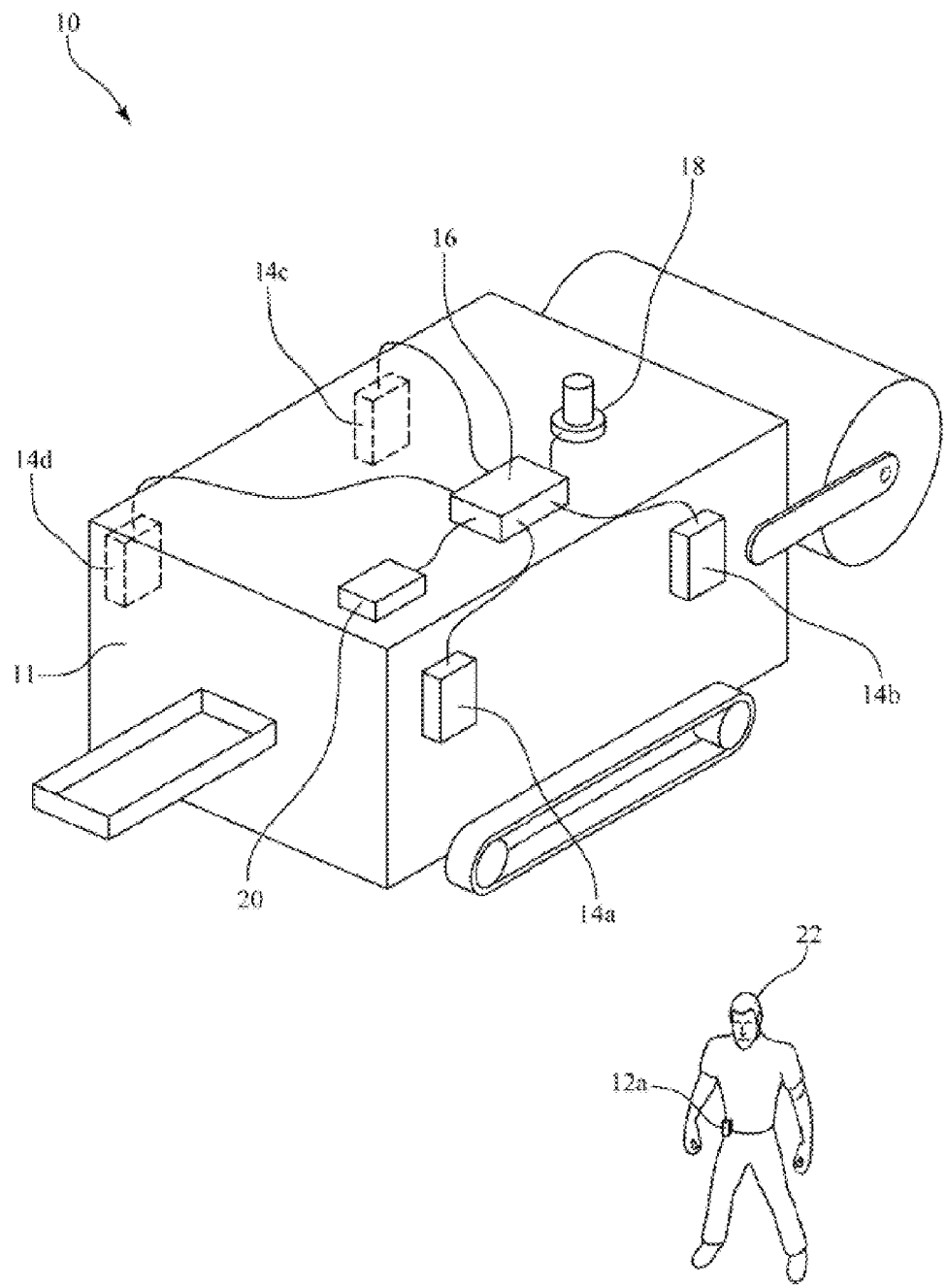
FIG. 2 is a schematic diagram of the exemplary system of claim 1.

FIG. 1 and FIG. 2 show an exemplary system 10 for detecting the proximity of a person 22 to a machine 11, including: at least a first locator 12a, a plurality of drivers 14a-14d, a controller 16, and a warning indicator or device 18. The drivers 14a-14d emit a magnetic field around the machine 11, and the locators 12a-12c respond to this magnetic field and communicate via radio frequency (RF) with the controller 16. The controller 16 performs an algorithm to determine where, in relation to the machine 11, the locators 12a-12c are positioned. When a locator, for example the first locator 12a, breaches one of the configurable zones 24, 26 created around the machine, the proper configuration action is performed.

The plurality of drivers 14a-14d and the controller 16 comprise a transmitter system. The proximity system controller 16 generates and transmits, through the plurality of drivers 14a-14d, a uniquely encoded magnetic signal, simultaneously or sequentially from each driver. The signal may be equal for all drivers or also may be unique to each driver. The controller 16 also generates and transmits a driver RF packet prior to the transmission of driver magnetic signals. The driver RF packet is transmitted from a digital radio transceiver located in the system controller 16. The driver RF packet contains parameters including: magnetic signal timing, signal duration, frequency construction, encoding, signal type, message time & date stamp, and machine serial number. This information allows the locator 12 to be synchronized with the driver 14 and search for and retrieve the signal in the presence of radio and magnetic noise.

The machine 11 also includes a control interface 20 for receiving commands to control operation of the machine 11 and for reporting an operating state of the machine 11.

The system utilizes a plurality of locators 12a-12c for being carried by a person 22 in proximity to the machine 11. Each locator, such as first locator 12a, receives the uniquely encoded magnetic proximity signal generated by the drivers 14a-14d and also receives the RF packet containing information from the machine driver RF transmission. The locator 12a processes the data from the plurality of drivers 14a-14d and the RF packet and transmits a response RF packet to the machine controller 16. The locator RF packet contains processed values from the plurality of driver received signals, driver RF packet, and processed locator data such as translated distance values from locator to each respective driver, locator serial number, message time & date stamp, locator battery status, and locator operational status.

The machine controller 16 is in communication with the plurality of driver units 14a-14d and includes or accesses data defining a first boundary around the machine 11. The processing unit 16 determines a location of the first locator unit 12a relative to the machine 11 based on the received signal strength of the magnetic proximity signal received by the locator from at least two of the plurality of driver units 14a-14d and the known location of the at least two of the plurality of driver units 14a-14d. The processing unit 16 then determines if the location of the first locator unit 12a relative to the machine 11 is within the first boundary around the machine 11 and outputs a proximity warning signal if the first locator unit 12a is within the first boundary around the machine 11.

The machine 11 includes a control interface 20 for controlling operation of the machine 11 and for reporting an operating state or operating status of the machine 11, and the controller 16 is in communication with the control interface 20. The machine 11 may be, for example, a continuous mining machine or another type of underground mining machine.

The warning device 18 is in communication with the processing unit 16 and provides at least a visual signal in response to receiving the proximity warning signal from the processing unit 16. The warning device 18 may also provides an audible signal in response to receiving the proximity warning signal from the processing unit 16. Thus, the warning device 18 may be, for example, a flashing strobe light and horn. Alternatively, the visual portion of the warning device may be incorporated into the status indicator 68 of each of the drivers 14a-14d.

Figure 3:
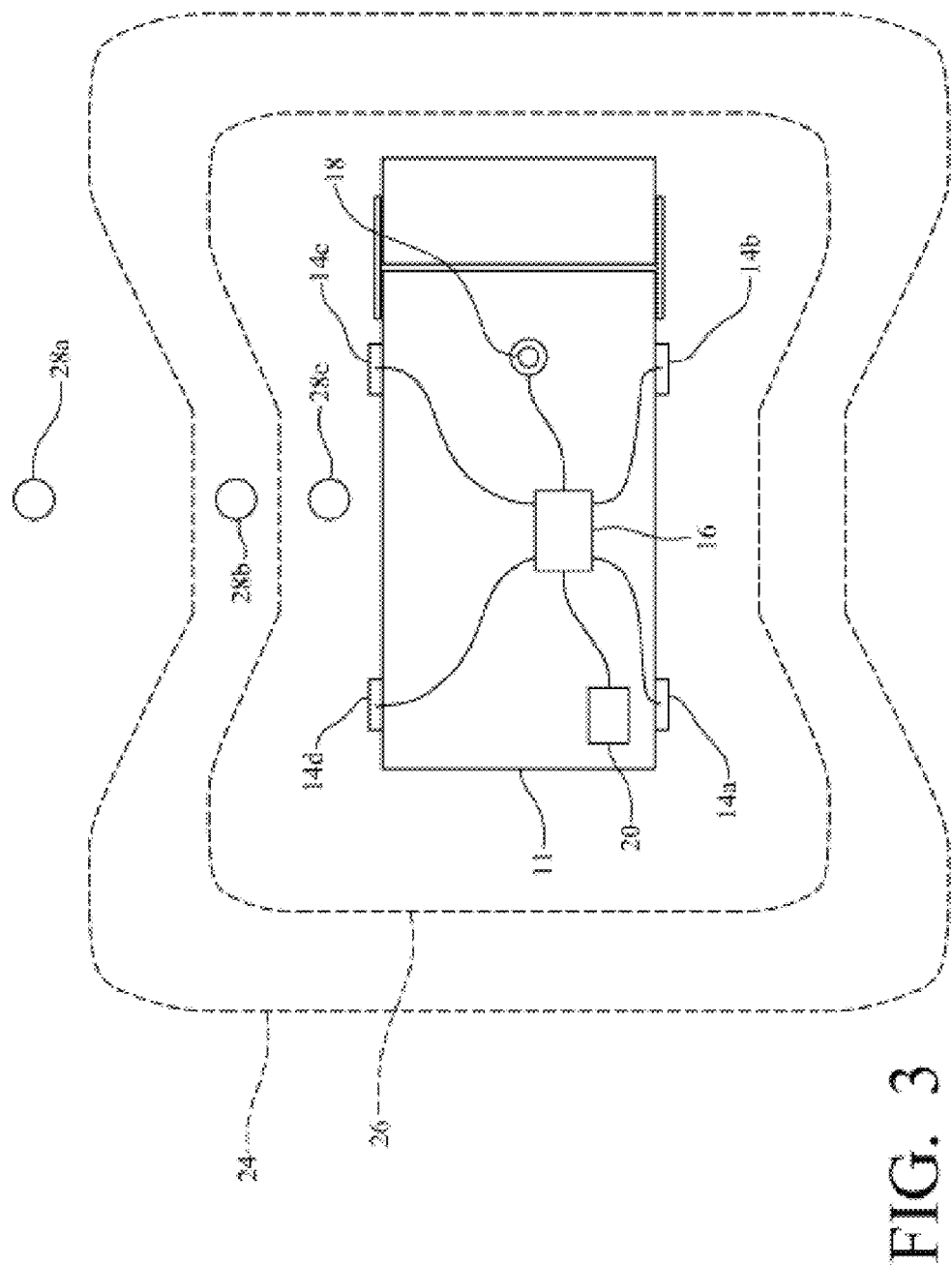
FIG. 3 is plan view showing exemplary boundaries around a machine operated with the exemplary system of FIG. 1.

FIG. 3 shows the machine 11 according to one presently preferred embodiment, including the plurality of drivers 14a-14d and a first boundary 24 around the machine 11. Advantageously, the first boundary 24 around the machine 11 can be defined to have any geometric shape. Also shown is a second boundary 26 around the machine 11. The second boundary 26 around the machine 11 is also defined by data included in or accessible by the controller 16. Thus, for example, the first boundary 24 may be considered a "warning boundary" and the second boundary 26 may considered a "operation limiting" boundary. Additional boundaries may also be defined by data accessible by the controller 16.

When the controller 16 determines the location of the first locator 12a or any other locator (e.g., second locator 12b, third locator 12c) (generally referred hereinafter as "locator 12"), the controller 16 will respond based on the determined location. Thus, for example, if the locator 12 is at a location 28a, which is outside of the first boundary 24 around the machine 11, no action would be taken. However, if the locator 12 is determined to be at a location 28b that is within the first boundary 24 around the machine 11, the warning device 18 (FIG. 1 and FIG. 2) will provide at least a visual signal indicating that the location of the locator 12 relative to the machine 11 is within the first boundary 24. Further, the controller 16 (FIG. 1 and FIG. 2) outputs a control signal to the control interface 20 (FIG. 1 and FIG. 2) to limit the operation of the machine 11 if the location of the locator is at a location 28c relative to the machine 11 is within the second boundary 26 around the machine 11.

As mentioned, the controller 16 may include data defining a plurality of boundaries around the machine 11. Then, the controller 16 may receive an operating state signal indicating the operating state of the machine 11 from the control interface 20 of the machine, select a boundary (i.e., a "selected boundary") from the plurality of boundaries around the machine 11 based on the operating state signal (i.e., different boundaries can be selected based on different operating states of the machine (e.g., mining, moving or"tramming," etc.)), and output a control signal to the control interface 20 to limit the operation of the machine 11 if the location of the locator 12 relative to the machine 11 is within the selected boundary.

Figure 4:
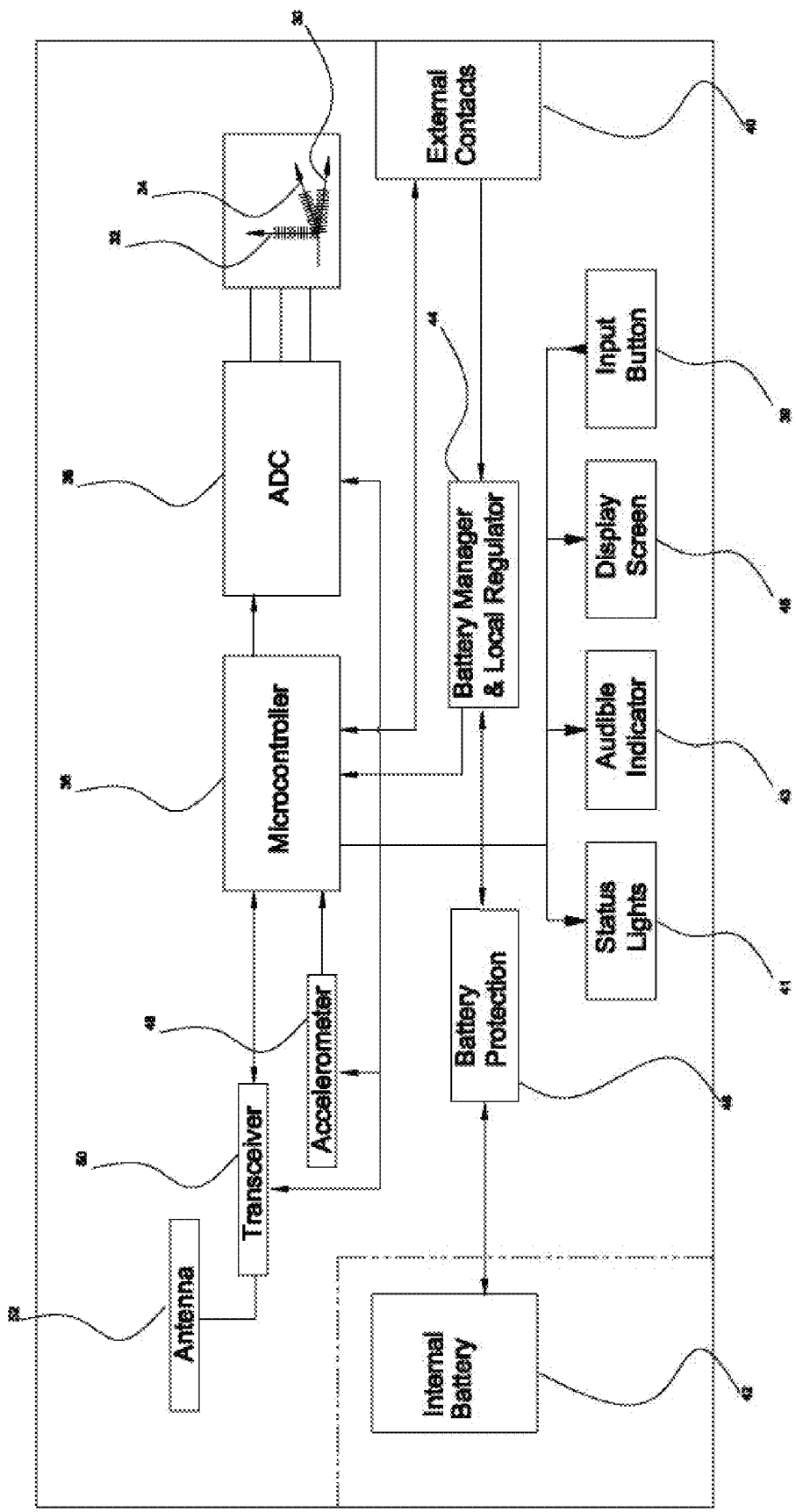
FIG. 4 is a functional block diagram of an exemplary locator of the exemplary system of FIG. 1.

FIG. 4 shows an exemplary locator 12, which is for being carried by a person. Although the drawings show only a single locator 12a, or three locators 12a, 12b, 12c, it is anticipated and understood that any number of locators 12 can be used. The locator unit 12 comprises a locator microcontroller 36 for processing data and controlling locator functions, and a first magnetic proximity signal receiving coil 30 for receiving the magnetic proximity signal. The first locator unit may further comprise: a second magnetic proximity signal receiving coil 32 in communication with the locator microcontroller 36 and oriented orthogonally to the first magnetic proximity signal receiving coil 30; a third magnetic proximity signal receiving coil 34 in communication with the locator microcontroller 36 and oriented orthogonally to the first magnetic proximity signal receiving coil 30 and to the second magnetic proximity signal receiving coil 32; and an accelerometer 48 in communication with the locator, the accelerometer measuring a direction of gravity.

The locator microcontroller 36 receives from all coils 30, 32, 34 the magnetic proximity signal and then may process the signals in any combination, mathematically processed or raw, from individual or multiple coils. The locator 12 may also select a most appropriate single coil signal based on the direction of gravity. The output from the coil or coils then passes through an analog to digital converter 38 before being received by the microcontroller 36 and/or transceiver 50.

The locator also contains a digital radio transceiver 50 receiving and transmitting RF packets by way of antenna 52. The locator microprocessor 36 receives the driver RF packet containing synchronization, frequency construction, encoding, and signal type information. This information allows the locator 12 to be synchronized with the driver 14 and search for and retrieve the magnetic signal in the presence of radio and magnetic noise.

The locator microcontroller 36 processes the data from the plurality of drivers 14a-14d and the driver RF packet and transmits a locator RF packet to the machine controller 16. The locator RF packet contains processed values from the plurality of driver received signals, driver RF packet, and processed locator data such as translated distance values from locator to each respective driver, locator serial number, message time & date stamp, locator battery status, and locator operational status.

The exemplary locator 12 is preferably contained in a dust proof enclosure that passes both the magnetic proximity signal and a digital radio transmission. The enclosure may be mechanically keyed to match a locator charging station (not shown), and includes external contacts 40 for making electrical contact with the transmitter charging station. When the locator 12 is inserted into the charging station, the external contacts 40 provide a safe means of charging an internal battery 42 and digitally communicating with the locator microcontroller 36. The digital communications may be used to perform functional integrity test on the locator and locator battery to ensure proper locator operation prior to field use. Also, preferably, the locator 12 is intrinsically safe.

Charging current is controlled by a battery manager and local regulator circuit 44. The internal battery 42 is connected to the battery manager and local regulator circuit 44 through a battery protection circuit 46. The battery protection circuit 46 protects the battery from overcharge, over discharge, and over current conditions. The battery manager and local regulator circuit 44 feeds power to the transmitter microcontroller 36 and the coil driver circuit 38. It is noted that the functionality of the battery manager and local regulator circuit 44 can be accomplished by other circuit configurations without departing from the spirit or the scope of the invention as claimed hereinafter.

The exemplary locator 12 also includes means for accepting input from and displaying information to the person 22. Specifically, an input button 39 which is in communication with the microcontroller 38 may be provided to accept input from the person 22. Status lights 41, an audible indicator 43 and/or a display screen 45 may also be provided in communication with the microcontroller 38 to provide information to the person 22. The display screen 45 may further comprise a touch-screen type device that is capable of both displaying information to the person 22 and accepting input from the person 22.

Figure 5:
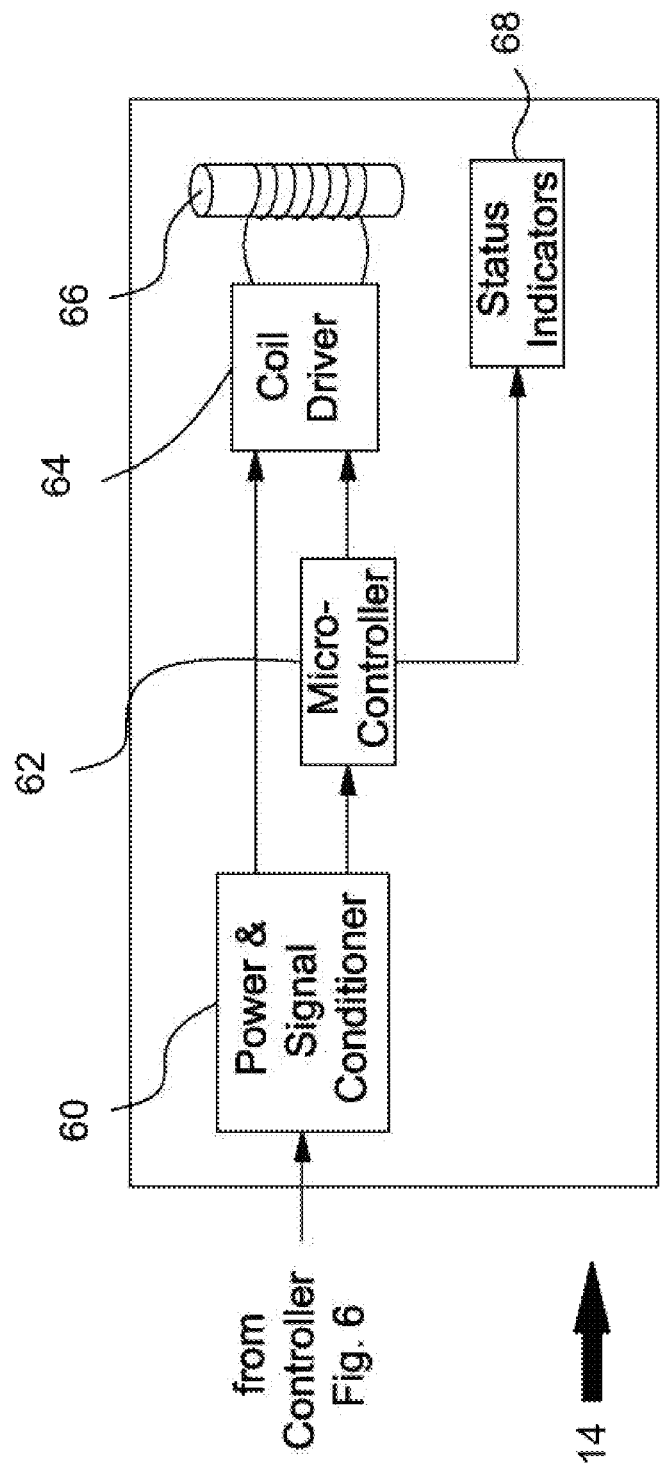
FIG. 5 is a functional block diagram of an exemplary driver of the exemplary system of FIG. 1.

FIG. 5 shows an exemplary driver 14 including a power and signal conditioner 60, microcontroller 62, coil driver 64, coil 66 and status indicators 68. A magnetic proximity signal is generated by the controller 16 and passed on to the driver(s) 14. The magnetic proximity signal is passes through a power and signal conditioner 60 to prepare it for transmission. The signal is then transmitted to the driver microprocessor 62 for further enhancement of modification. Alternatively, if no further enhancement or modification is required, the signal can be passed directly to the coil driver 64. Both the signal conditioner 60 and microcontroller 62 are in communication with the magnetic proximity transmitting coil 66 through the coil driver 64. Lighted status indicators 68 are in communication with the driver microcontroller 62, and are externally visible to indicate to the operator that a magnetic proximity signal is being transmitted by the driver 14.

The exemplary driver 14 is contained in an enclosure that is strong enough to be machine mounted and survive in a mining environment, but still pass the magnetic proximity signal. Preferably, the enclosure (not shown) has at least one window to allow status lights to be visible externally.

Figure 6:
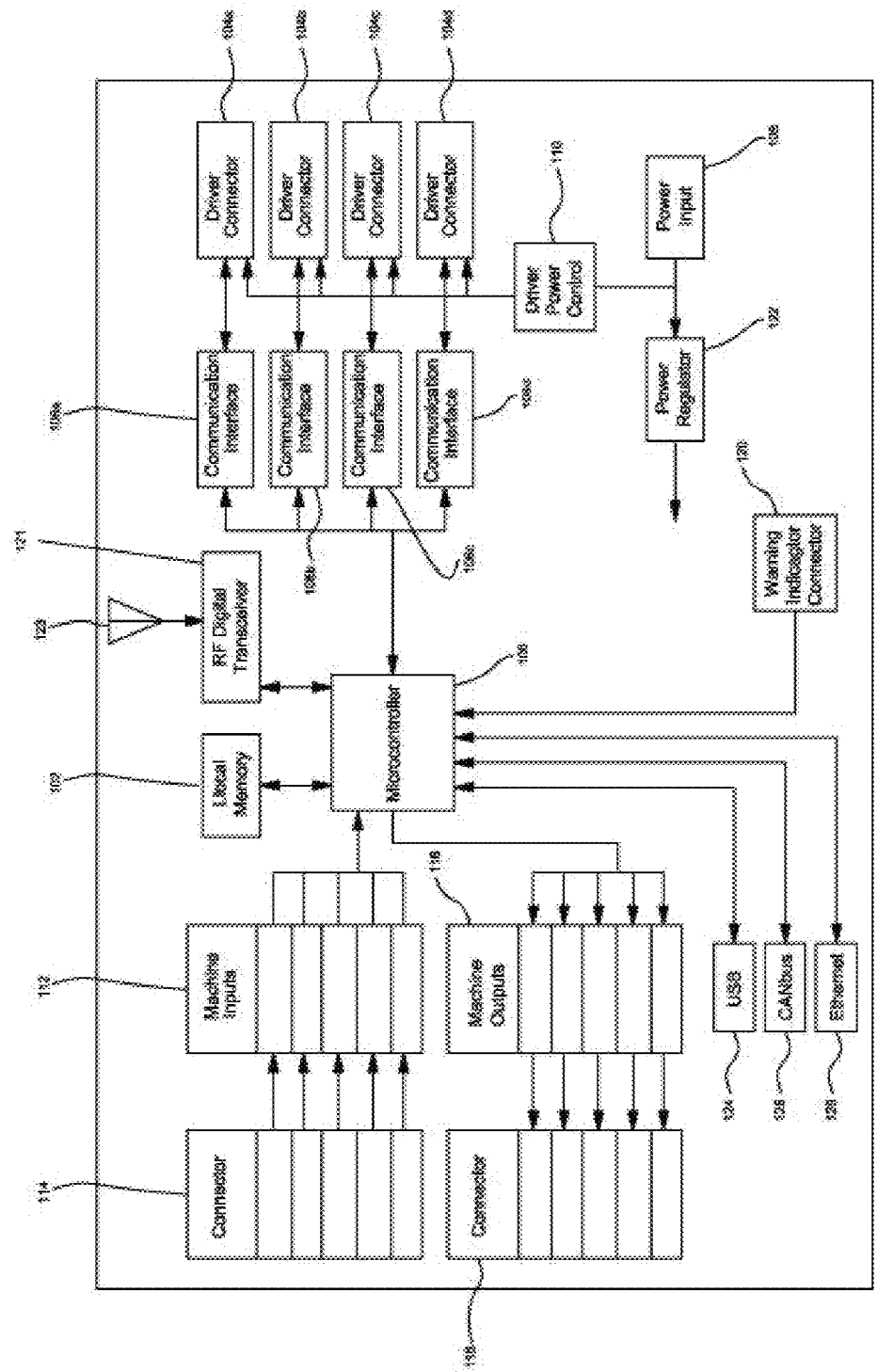
FIG. 6 is a functional block diagram of an exemplary controller of the exemplary system of FIG. 1.

FIG. 6 shows an exemplary controller 16 including a processing unit microcontroller 100 and a non-volatile storage medium 102. The controller microcontroller 100 is in communication with a plurality of driver connectors 104a-104d through a plurality of communication interfaces 106a-106d. Each of the plurality of driver connectors 104a-104d is in communication with a respective one of the drivers 14a-14d (FIG. 1 and FIG. 2).

The exemplary controller 16 receives power from the machine via a power input 108. A receiver power controller 110 is in communication with the power input 108 and preferably provides intrinsically safe power to the plurality of drivers 14a-14d (FIG. 1 and FIG. 2) via the plurality of driver connectors 104a-104d. The plurality of communication interfaces 106a-106d also preferably makes communication between the controller microcontroller 100 and the plurality of drivers 14a-14d (FIG. 1 and FIG. 2) intrinsically safe. However, it is noted that the principals taught herein are not limited to configurations requiring intrinsically safe power, but apply generally to equivalent non-intrinsically safe configurations. Preferably, the exemplary controller 16 is housed in an explosion proof enclosure.

Also shown are machine inputs 112, machine input connectors 114, machine outputs 116 and machine output connectors 118, which cooperate with the control interface 20 of the machine 11 (FIG. 1 and FIG. 2) for receiving the operating state signal indicating the operating state of the machine 11 and outputting a control signal to the control interface 20 of the machine 11. Additional input/output to the controller microcontroller 100 are provided by USB 124, CANbus 125 and Ethernet 126 connectors.

Still further, the controller microcontroller 100 is in communication with a warning indicator connector 120 for outputting the proximity warning signal. A power regulator 122 is in communication with the power input 108 and provides power to the exemplary controller 16.

The controller 16 further includes a digital radio transceiver 121 and digital radio antenna 123. One or more antennas 123 may be used as needed. The antenna 123 is shown in FIG. 6 as being internal to the housing of the controller 16. Alternatively, the system may utilize one or more antennas that can be mounted externally to the controller 16. The transceiver 121 is in communication with the microcontroller 100 for receiving and processing the RF packet from the locator(s) 12, which contains processed values from one or more of the plurality of driver received signals, driver RF packet, and processed locator data such as translated distance values from locator to each respective driver, locator serial number, message time & date stamp, locator battery status, and locator operational status.

The controller 16 further may use the microcontroller 100 to process data packets for use by remote monitoring and control systems. These packets may be transmitted via the digital radio transceiver 121 and digital radio antenna 123 for receipt by external systems. Further, the controller 16 may use the microcontroller 100 to process data packets transmitted from a remote system and received via the digital radio transceiver 121 and digital radio antenna 123.

Figure 7:
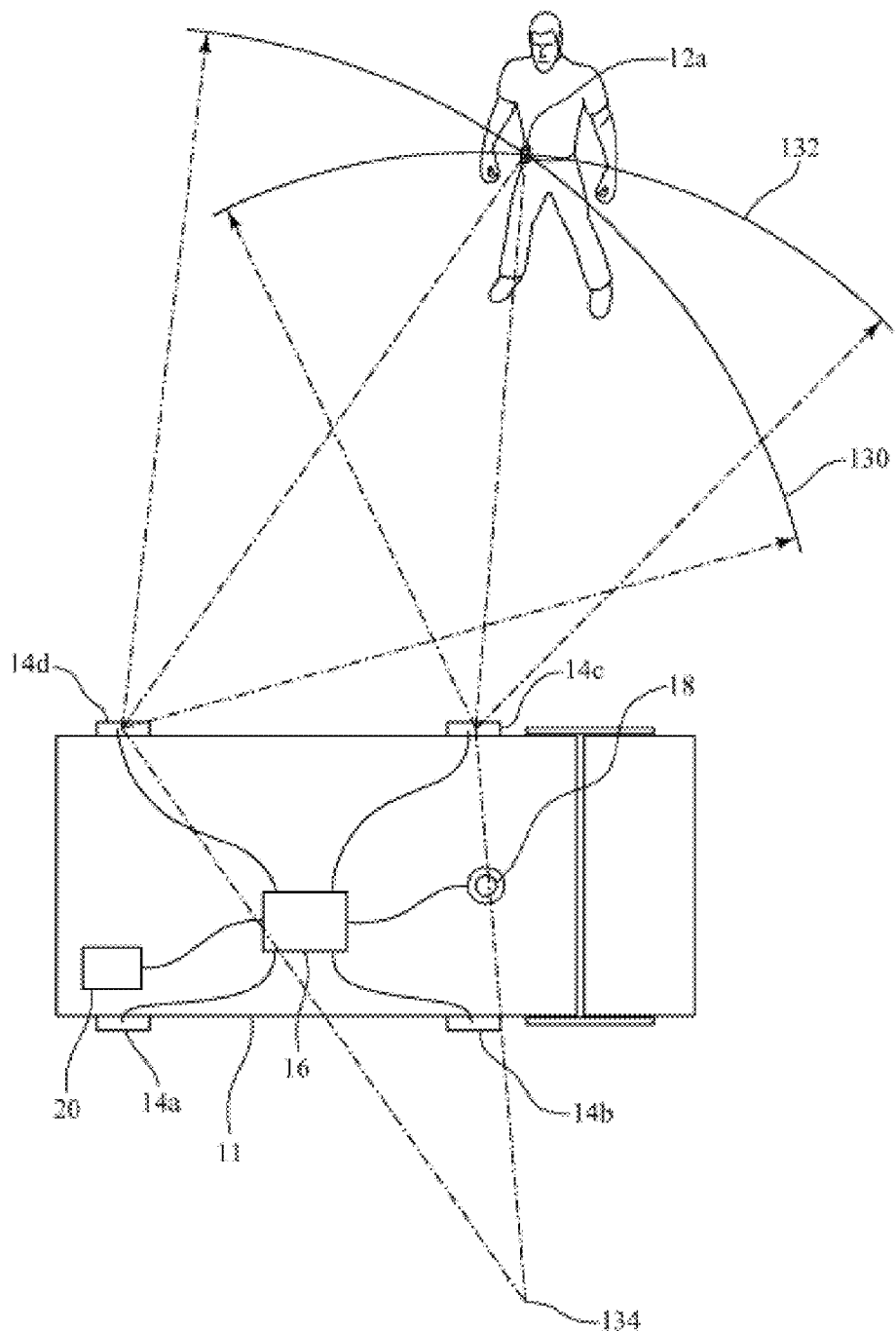
FIG. 7 is a schematic diagram of an operator in proximity to a machine whose location is determined using two of a plurality of the drivers.

For example, in one exemplary methodology for determining the position of the locator(s), as shown in FIG. 7, for each RF transmission by the transceiver 50 of the locator(s) 12, the controller 16 will receive a distance value from at least two of the plurality of drivers 14a-14d. The controller 16 then selects the two drivers (e.g., two of drivers 14a-14d) with the lowest distance values, or drivers 14c and 14d in the example. Given the known locations of the drivers 14c, 14d mounted on the machine 11, an arc of distance 130, 132 from each driver 14c, 14d is determined. The two arcs 130, 132 will intersect in two places. The location that is to the exterior of the machine 11 is the correct location. The second location 134 is dismissed since it is not to the exterior of the machine 11 with reference to the drivers 14c, 14d, and because the second location 134 would also be closer to the other drivers 14a, 14b if this was the real location.

One of skill in the art will recognize that other equivalent methodologies for determining the position(s) of the locator(s) are possible within the spirit and scope of the invention as claimed hereinafter. Such methodologies may utilize more than two drivers to perform the locating function and calculation. Similarly, in some configurations, only a single driver may be used to perform the locating function and calculation.

Figure 8:
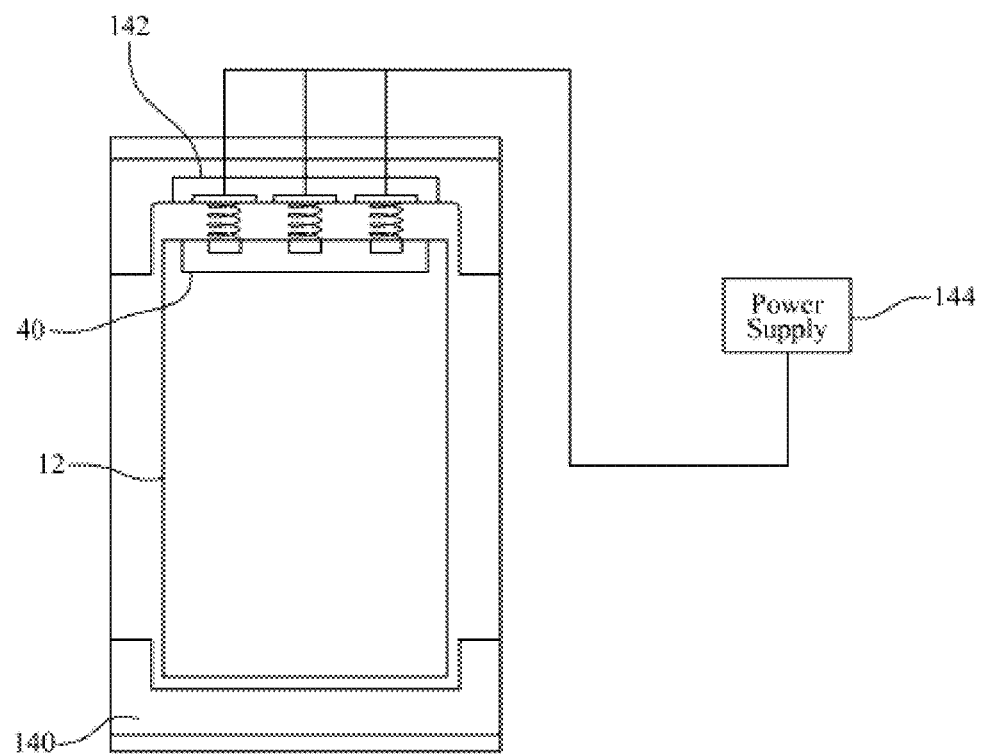
FIG. 8 is a schematic diagram of an exemplary locator positioned in an exemplary charger unit.

FIG. 8 shows an exemplary locator 12 positioned in an exemplary charger unit 140. The external context 40 of the exemplary locator 12 are biased against a set of charging contacts 142 of the charger 140, which are supplied with power from a power supply 144. Additionally, although not shown, a communication with the locator microcontroller 36 may also be made through the external context 40 of the locator 12 and the charger context 142 of the charger 140.

Figure 9:
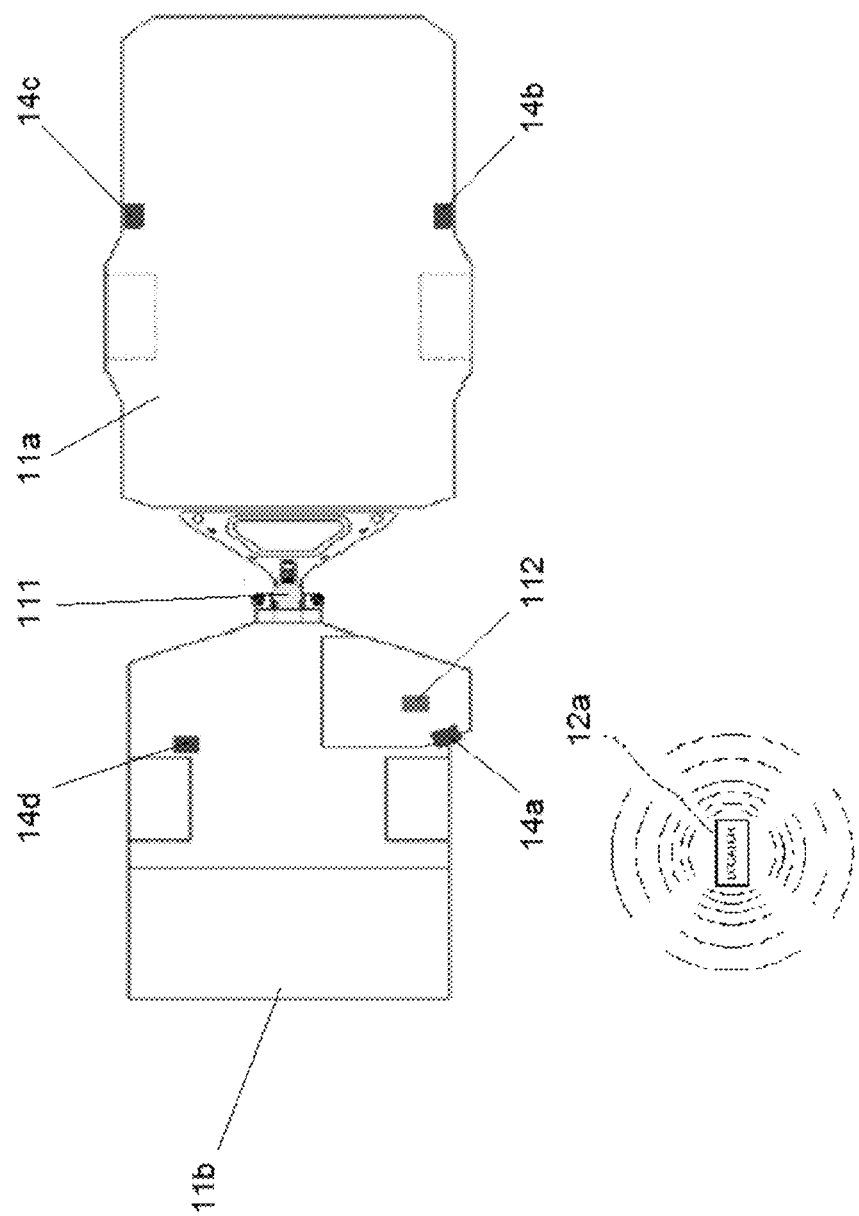
FIG. 9 is a top plan view showing an alternative embodiment of the system for proximity detection in use on an articulating machine.

FIG. 9 shows an alternative embodiment of the system for proximity detection in use on an articulating machine having a front section 11a and a rear section 11b connected at an articulation point 111. As in the embodiment shown in FIGS. 1-8, a plurality of drivers 14a-14d are positioned on the machine. According to the particular embodiment shown in FIG. 9, first and second drivers 14a, 14c are located on the front section 11a of the machine, and third and fourth drivers 14b, 14d are located on the rear section 11b of the machine. The remaining components (e.g. controller 16, warning indicator 18, and control interface 20) of the system for proximity detection according to this embodiment are the same as in the embodiment shown in FIGS. 1-8, and are not shown here for convenience.

The addition of a machine mounted locator 112 at a known fixed position on the rear section 11b of the machine allows for the calculation of the angle at the articulation point 111 when the machine articulates. With this data, an algorithm that has been updated to utilize the position of the machine mounted locator 112 can be used to determine the location of an external locator 12a. Specifically, the new position of the drivers 14b, 14d associated with the rear section 11b of the machine is used, within the current tracking algorithm, to calculate the position of locator 12a, relative to the machine. This configuration is specifically for articulating machinery and not all equipment will need the machine mounted locator 112.

Once established, the zones, or boundaries 24, 26 (FIG. 3) around the machine 11 may change dynamically based on machine 11 feedback to the controller 16. The size and location of the zones may change based on the machine 11 moving or stationary, the speed of the machine, the articulation angle, etc. This is particularly important for the articulating machine embodiment shown in FIG. 9.

One of ordinary skill in the art will recognize that additional steps and configurations are possible without departing from the teachings of the invention. Although the preferred embodiments of the present invention describe and utilize magnetics data to calculate the location of the person or second machine, other similar distance measurement data from a variety of sensors may be used to obtain similar results. One such alternative to magnetics data would be to utilize radio waves to calculate the location of the person or second machine. Such radio wave technologies as RAdio Detection And Ranging (RADAR) or Radio Frequency IDentification (RFID) may be used within the spirit and scope of the present invention. Similarly, laser light based remote sensing technologies such as LIght Detection And Ranging (LIDAR) may also be used to as a substitute for magnetics data. Other equivalent technologies for remote sensing will be apparent to those of skill in the art.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. A system for detecting a position of an object relative to a machine, comprising:
   a transmitter system located on the machine;
   a locator for being carried by the object;
   means for determining coordinates of said locator relative to the transmitter system;
   means for defining one or more safety zones around the machine; and
   warning means for generating a signal when said locator enters into any of said one or more safety zones.

2. The system for position detection according to claim 1 wherein the transmitter system includes a controller for generating a uniquely encoded magnetic signal and a plurality of drivers in communication with said controller for transmitting said uniquely encoded magnetic signal.

3. The system for position detection according to claim 2 wherein transmitter system further includes a digital radio transceiver located in the controller, and wherein the controller also generates a driver radio frequency signal and the digital radio transceiver transmits said driver radio frequency signal.

4. The system for position detection according to claim 3 wherein the encoded signal is a uniquely encoded magnetic signal and the locator comprises:
   a locator microcontroller for processing data and controlling locator functions;
   one or more magnetic proximity signal receiving coils in communication with the locator microprocessor for receiving the uniquely encoded magnetic signal;
   a digital radio transceiver in communication with the locator microcontroller for receiving said driver radio frequency signal and transmitting a locator radio frequency signal.

5. The system for position detection according to claim 4, wherein the one or more magnetic proximity receiving coils comprises:
   a first magnetic proximity signal receiving coil;
   a second magnetic proximity signal receiving coil oriented orthogonally to the first magnetic proximity signal receiving coil; and
   a third magnetic proximity signal receiving coil oriented orthogonally to the first magnetic proximity signal receiving coil and to the second magnetic proximity signal receiving coil.

6. The system for position detection according to claim 4, further comprising means for accepting user input and displaying information to a person.

7. The system for position detection according to claim 2, wherein the encoded signal is a uniquely encoded magnetic signal and each of said plurality of drivers comprises:
   a power and signal conditioner in communication with the controller for preparing the magnetic signal generated by the controller for transmission;
   a coil driver in communication with the signal conditioner for receiving the magnetic signal for transmission;
   a magnetic proximity transmitting coil in communication with the coil driver for transmitting the magnetic signal.

8. The system for position detection according to claim 7, wherein each of said plurality of drivers further comprises:
   a driver microcontroller positioned between and in communication with the signal conditioner and the coil driver for further enhancing or modifying the magnetic signal for transmission; and
   status indicators in communication with the driver microcontroller, said status indicators being externally visible to indicate to the person that the magnetic signal is being transmitted by the driver.

9. The system for position detection according to claim 8, further comprising an enclosure surrounding said power and signal conditioner, driver microcontroller coil driver and transmitting coil; said enclosure formed from a material that is strong enough to be machine mounted and survive in a mining environment, but still pass the magnetic proximity signal.

10. The system for position detection according to claim 2 wherein the controller comprises a controller microcontroller in communication with a plurality of driver connectors through a plurality of corresponding communication interfaces, wherein each of the plurality of driver connectors is in communication with a respective one of the plurality of drivers.

11. The system for position detection according to claim 10 wherein the controller further comprises a digital radio transceiver and digital radio antenna in communication with the controller microcontroller for processing and transmitting a driver radio frequency signal generated by the controller and for receiving and processing a locator radio frequency signal from the locator.

12. The system for position detection according to claim 2 further comprising a control interface in communication with said controller for receiving commands to control operation of the machine and for reporting an operating state of the machine.

13. The system for position detection according to claim 2 wherein the warning means comprises a warning indicator in communication with the controller microcontroller for outputting the proximity warning signal.

14. The system for position detection according to claim 1 wherein said locator comprises a plurality of locators associated with a corresponding plurality of persons.

15. The system for position detection according to claim 1 wherein said means for determining the position of said locator includes an algorithm performed at the transmitter system based on a magnetic signal and a locator radio frequency signal.

16. The system for position detection according to claim 1 wherein said means for defining one or more safety zones comprises data input into said controller defining a corresponding one or more boundaries within a magnetic signal generated by said transmitter system.

17. The system for position detection according to claim 16 wherein said one or more safety zones comprise a first warning boundary zone and a second operation limiting boundary zone.

18. The system for position detection according to claim 16 further comprising means for dynamically altering said one or more safety zones.

19. The system for position detection according to claim 2 wherein the machine is an articulating machine comprising a front section and a rear section connected to the front section at an articulating point, said system further comprising a machine mounted locator positioned on the rear section of said articulating machine, and wherein one or more of said plurality of drivers are positioned on the front section of the articulating machine and one or more of the plurality of drivers are positioned on the rear section of the articulating machine.

20. The system for position detection according to claim 1 wherein the object is a person.

21. A method for detecting a position of an object relative to a machine comprising:
generating and transmitting an encoded signal around the machine from a transmitter system located on the machine;
receiving said encoded signal at a locator carried by the object;
processing said encoded signal at the locator;
transmitting a locator radio frequency signal from the locator in response to the received and processed encoded signal;
receiving the locator radio frequency signal at the transmitter system; and
performing an algorithm at the transmitter system based on the encoded signal and locator radio frequency signal to determine coordinates of the locator relative to the transmitter system.

22. The method of claim 21 further comprising:
defining one or more safety zones around the machine;
determining if the location of said locator relative to the machine is within said one or more safety zones around the machine; and
generating a warning signal when said locator enters into any of said one or more safety zones.

23. The method of claim 22 wherein the step of emitting an encoded signal around the machine from a transmitter system located on the machine comprises:
generating the encoded signal from a controller of the transmitter system; and
transmitting the encoded signal from a plurality of drivers in communication with said controller.

24. The method of claim 23 further comprising:
generating a driver radio frequency signal at the controller; and
transmitting said driver radio frequency signal from a digital radio transceiver located in the controller.

25. The method of claim 24 wherein the driver radio frequency signal is generated and transmitted prior to generating and transmitting the encoded signal.

26. The method of claim 25 wherein the driver radio frequency signal contains parameters including magnetic signal timing, signal duration, frequency construction, encoding, signal type, message time & date stamp, and machine serial number, and further comprising synchronizing the locator with one or more of said plurality of drivers.

27. The method of claim 22 wherein the step of performing an algorithm at the transmitter system based on the encoded signal and locator radio frequency signal to determine a position of the locator relative to the transmitter system comprises comparing a received signal strength of the encoded signal received by the locator from at least two of the plurality of drivers and known locations of the at least two of the plurality of drivers.

28. The method of claim 27 further comprising:
receiving a distance value from at least two of the plurality of drivers for each locator radio frequency signal;
selecting the two drivers with the lowest distance values;
determining an arc of distance from each one of said two drivers given the known locations of said two drivers;
determining the two points at which the arc from the first one of said two drivers intersects with the arc of the second one of said two drivers;
determining the location of the locator by selecting the one of two points of intersecting arcs that is external to the machine.

29. The method of claim 21 wherein the encoded signal is a magnetic signal.

30. The method of claim 21 wherein the object is a person.

31. The system for position detection according to claim 1, wherein said one or more safety zones are defined by data input into the system and not by signals transmitted by the transmitter system.

* * * * *